(No Model.)

C. M. PITEL.
SUSPENDING DEVICE.

No. 511,795. Patented Jan. 2, 1894.

WITTNESSES.
Geo. H. Chittenden
W. B. Allen

Conrad M. Pitel
INVENTOR
BY Geo. L. Cooper
ATTORNEY

UNITED STATES PATENT OFFICE.

CONRAD M. PITEL, OF MERIDEN, CONNECTICUT, ASSIGNOR TO THE EDWARD MILLER & COMPANY, OF SAME PLACE.

SUSPENDING DEVICE.

SPECIFICATION forming part of Letters Patent No. 511,795, dated January 2, 1894.

Application filed August 25, 1893. Serial No. 484,074. (No model.)

*To all whom it may concern:*

Be it known that I, CONRAD M. PITEL, a citizen of the United States, residing at Meriden, New Haven county, Connecticut, have invented a new and useful Improvement in Suspending Devices, of which the following is a specification.

My invention relates to that class of suspending devices in which suspending cords or chains are wound upon a spring inclosing drum provided with a friction brake. It is intended to provide a cheap, simple and positive brake or frictional control of the drum.

Figure 1:
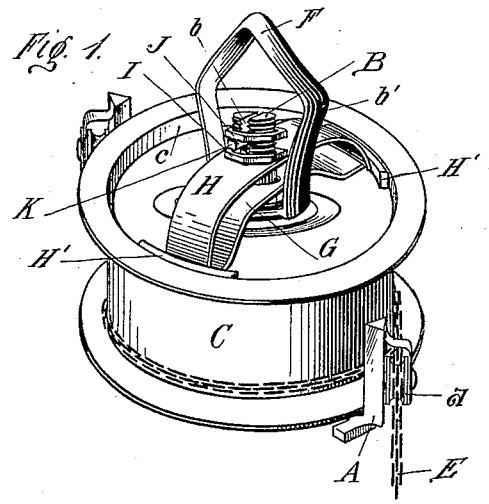
Figure 2:
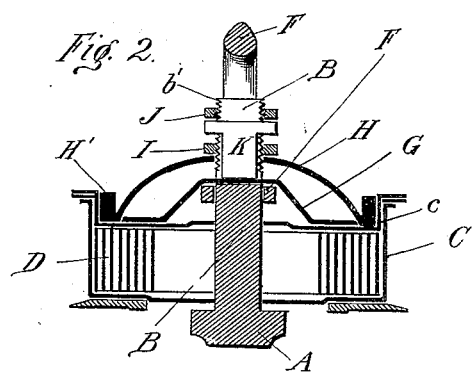
Figure 3:
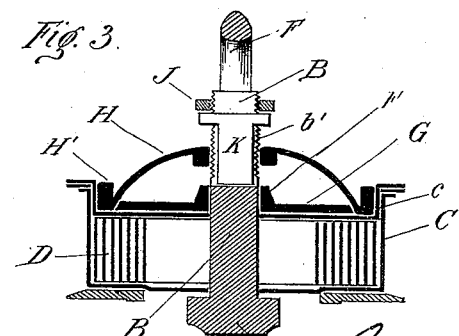

In the accompanying drawings Figure 1 represents in perspective a suspending device embodying my improvement. Fig. 2 is a central vertical section of the same. Fig. 3 also in central vertical section shows a modification.

The same letters refer to like parts in the several views.

A, designates a frame; $a$, a guide on the frame A; B, an arbor; $b$, a slot in the arbor B; $b'$, a screw-thread on the arbor B; C, a drum; $c$, a vertical flange in the head of the drum C; D, a convolute spring; E, a chain or cord; F, a loop or hanger; G, a spreader; H, a brake spring; H', a brake shoe; I, J, adjusting nuts; K, a thrust rod.

In the example of my invention illustrated in Figs. 1 and 2 of the drawings the frame A, guides $a$, drum C, spring D and chains or cords E may be of convenient form. The arbor B here shown as vertical and integral with the frame A is formed at its upper end with a slot $b$ and an external screw-thread $b'$, the functions of which will hereinafter appear. The loop or hanger F surrounds the upper end of the arbor B and is capable of vertical motion thereon. Above the lower part of the loop F and also surrounding the arbor B is the spreader G. As shown, the central aperture in the spreader G is provided with re-entering tongues which play in the slot $b$ in the arbor B. Also surrounding the arbor B and above the spreader G is a semi-elliptic brake spring H to the free ends of which are attached the brake shoes H', the outer arc-like faces of which are adapted to frictional engagement with the vertical flange $c$ in the head of the drum C. As here shown the brake spring H is held from upward motion on the arbor B by a nut I. A second nut J on the screw-thread $b'$ presses upon the upper end of the thrust rod K, which passes through the slot $b$ in the arbor B to the upper side of the spreader G.

The operation of my device will be readily understood from an inspection of the drawings. It is of course clear that the arrangement of parts is such that the lowering of the article suspended from the chains E acts to wind the spring D and that the reaction of this spring assists in raising the suspended article. It is also plain that the weight of the article suspended and of the device itself depends from the loop F, which is intended as usual to engage with a ceiling hook or the like. When the suspended article is drawn down by the operator the spreader G rises, relatively, between the ends of the brake spring H forcing these ends apart and pressing the shoes H' against the flange $c$ of the drum C. The friction thus caused between the brake shoes H' and the flange $c$ acts to prevent the too rapid lowering of the suspended article, while the static friction between the same surfaces acts to hold the article in any desired position. When the article is raised by the operator the resilience of the brake spring H acts to reduce the frictional resistance to the rotation of the drum C and the spring D acts to rewind the chains E and to assist in raising the suspended article. The adjusting nut I acts through the thrust rod K to regulate the amount of vertical motion of the spreader G and hence the amount of force exerted by the spreader on the brake spring H.

In Fig. 3 of the drawings I have shown the spreader G as integral with the loop F and the brake spring H as secured to the arbor C thereby dispensing with the nut I. It is obvious that the operation of the device is not thereby changed. I am satisfied that other mechanical alterations may be made in my device without departing from my invention.

In a pending application Serial No. 479,314, I have shown a device of this general type in which the drum is capable of vertical motion with the loop on the arbor. I do not of course claim as of my present invention anything therein shown or described.

I am aware of United States Patent No. 481,157, in which a loop vertically movable on an arbor acts to raise the inner end of a brake lever the outer end of which bears upon a spring inclosing drum to frictionally resist its rotation. I do not claim as of my invention anything shown or described in said patent. My device may be considered as an improvement on the one therein shown, a spring being substituted for the yoke, levers and pivots of that patent to the considerable simplification and cheapening of the product.

What I claim as my invention, and desire to secure by Letters Patent of the United States, is as follows:

1. In a suspending device in combination, an arbor, a spring actuated drum on said arbor, a chain on said drum, a loop on said arbor and capable of vertical motion thereon, a spreader moving with said loop and a brake consisting of a resilient radial arm and a shoe at the outer end of said arm said brake engaging with said spreader and bearing against said drum, substantially as described.

2. In a suspending device in combination an arbor, a spring actuated drum on said arbor, a flange in the head of said drum, a chain on said drum, a loop on said arbor and capable of vertical motion thereon, a spreader moving with said loop and a brake consisting of a resilient radial arm and a shoe at the outer end of said arm said brake engaging with said spreader and bearing against said flange in the head of said drum, substantially as described.

3. In a suspending device in combination an arbor, a spring actuated drum on said arbor, a chain on said drum, a loop on said arbor and capable of vertical motion thereon, a spreader moving with said loop, means as an adjusting nut for regulating the motion of said loop and spreader and a brake consisting of a resilient radial arm and a shoe at the outer end of said arm said brake engaging with said spreader and bearing against said drum, substantially as described.

4. In a suspending device in combination an arbor, a spring actuated drum on said arbor, a chain on said drum, a loop on said arbor and capable of vertical motion thereon, a spreader moving with said loop and a brake consisting of a resilient portion mounted on said arbor and a shoe bearing against said drum, said spreader and said resilient portion being adapted to engage to operate said brake shoe, substantially as described.

CONRAD M. PITEL.

Witnesses:
GEO. L. COOPER,
GEO. M. CHITTENDEN.